US011048942B2

(12) United States Patent
Yun et al.

(10) Patent No.: US 11,048,942 B2
(45) Date of Patent: Jun. 29, 2021

(54) METHOD AND APPARATUS FOR DETECTING A GARBAGE DUMPING ACTION IN REAL TIME ON VIDEO SURVEILLANCE SYSTEM

(71) Applicant: ELECTRONICS AND TELECOMMUNICATIONS RESEARCH INSTITUTE, Daejeon (KR)

(72) Inventors: Kimin Yun, Daejeon (KR); Yongjin Kwon, Daejeon (KR); Jin Young Moon, Daejeon (KR); Sungchan Oh, Daejeon (KR); Jongyoul Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 118 days.

(21) Appl. No.: 16/401,789

(22) Filed: May 2, 2019

(65) Prior Publication Data
US 2019/0347486 A1   Nov. 14, 2019

(30) Foreign Application Priority Data

May 8, 2018   (KR) .................... 10-2018-0052753

(51) Int. Cl.
*G06K 9/00*   (2006.01)
*G06T 7/00*   (2017.01)
(Continued)

(52) U.S. Cl.
CPC ........ *G06K 9/00718* (2013.01); *G06T 7/0002* (2013.01); *G06T 7/20* (2013.01);
(Continued)

(58) Field of Classification Search
CPC ..... G06K 2009/00738; G06K 9/00718; G06K 9/00771; G06K 9/6269; G06T 2207/30241; G06T 7/0002; G06T 7/20; G06T 7/70
See application file for complete search history.

(56) References Cited

U.S. PATENT DOCUMENTS 8,159,537 B2   4/2012   Itoh et al.
8,582,822 B2   11/2013  Iwasaki et al.
(Continued)

FOREIGN PATENT DOCUMENTS

JP   2014522035 A   8/2014
KR   10-2008-0036512 A   4/2008
(Continued)

OTHER PUBLICATIONS

Seo, Jeong-Min, et al. "Behavior Recognition of a Person in a Daily Video Using Joint Position Information." 2018 IEEE First International Conference on Artificial Intelligence and Knowledge Engineering (AIKE). IEEE, 2018. (Year: 2018).*
(Continued)

*Primary Examiner* — Nirav G Patel
(74) *Attorney, Agent, or Firm* — Rabin & Berdo, P.C.

(57) ABSTRACT

A method and apparatus for detecting a garbage dumping action in real time on a video surveillance system are provided. A change region, which is a motion region, from an input image is detected, joint information including joint coordinates corresponding to a region in which joints exist is generated, and an object held by a person from the image using the change region and the joint information is detected. Then, an action of dumping the object based on a distance between the object and the joint coordinates is detected.

20 Claims, 10 Drawing Sheets

(51) Int. Cl.
*G06T 7/70* (2017.01)
*G06T 7/20* (2017.01)

(52) U.S. Cl.
CPC ...... *G06T 7/70* (2017.01); *G06K 2009/00738* (2013.01); *G06T 2207/30241* (2013.01)

(56) References Cited

U.S. PATENT DOCUMENTS

| | | | |
|---|---|---|---|
| 8,712,099 | B2 | 4/2014 | Ku et al. |
| 9,098,740 | B2 | 8/2015 | Yoo et al. |
| 9,286,694 | B2 | 3/2016 | Kim et al. |
| 9,378,559 | B2 | 6/2016 | Lee et al. |

FOREIGN PATENT DOCUMENTS

| | | |
|---|---|---|
| KR | 10-2012-0083086 A | 7/2012 |
| KR | 10-1180887 B1 | 9/2012 |
| KR | 10-1407394 B1 | 6/2014 |
| KR | 10-2014-0108789 A | 9/2014 |
| KR | 101554677 B1 | 10/2015 |
| KR | 10-2016-0085622 A | 7/2016 |
| KR | 10-1846074 B1 | 4/2018 |
| WO | 2011080900 A1 | 7/2011 |

OTHER PUBLICATIONS

Cao, Zhe, et al. "Realtime multi-person 2d pose estimation using part affinity fields." Proceedings of the IEEE conference on computer vision and pattern recognition. 2017. (Year: 2017).*

Yun, Kimin, et al. "Vision-based garbage dumping action detection for real-world surveillance platform." ETRI Journal 41.4 (2019): 494-505. (Year: 2019).*

Mahankali, Sriya, et al. "Identification of illegal garbage dumping with video analytics." 2018 International Conference on Advances in Computing, Communications and Informatics (ICACCI). IEEE, 2018. (Year: 2018).*

* cited by examiner

METHOD AND APPARATUS FOR DETECTING A GARBAGE DUMPING ACTION IN REAL TIME ON VIDEO SURVEILLANCE SYSTEM

CROSS-REFERENCE TO RELATED APPLICATION

This application claims priority to and the benefit of Korean Patent Application No. 10-2018-0052753 filed in the Korean Intellectual Property Office on May 8, 2018, the entire contents of which are incorporated herein by reference.

BACKGROUND OF THE INVENTION

(a) Field of the Invention

The present invention relates to video surveillance, and more particularly, to a method and apparatus for detecting a garbage dumping action in real time in a video surveillance system.

(b) Description of the Related Art

The installation of closed circuit television (CCTV) has been increasing in accordance with the spread of cameras and public safety and security issues. In the video surveillance system such as CCTV, there has been much research on CCTV image analysis as an early application of computer vision technology which allows a computer to understand and interpret the captured images, but practicality thereof is still insufficient. CCTV image analysis can be easily applied to regions where there are dozens or hundreds of channels of images at the same time, and it has advantages such as reducing a controller's fatigue. However, it is not easy to understand and identify high-level events such as assaults and accidents in video images, and there are disadvantages such as detection applications of such events may cause many false detections.

Recently, in order to monitor the action of garbage dumping, which causes a lot of social problems, there are systems in which a surveillance camera is installed in regions where garbage dumping action is frequent, and a warning is given by a person watching a video. In such a system, generally, since a person analyzes images and gives a warning, it is required to detect garbage dumping action automatically from the images.

In the existing image analysis technology, researches on detecting objects or garbage that a person leaves are being carried out. Conventional methods use a foreground extraction technique to detect objects or garbage that a person leaves and so on. Using an assumption that a specific object has been left by a person if a change in the image lasts for a long time after the specific object appears in the scene of the image, objects that a person leaves or dangerous objects and so on are detected by conventional methods.

However, these conventional methods have a problem as follows. Even in the case of a parked vehicle, the parked vehicle is detected as the object that a person leaves. Further, there is a limit in detecting an object even if the object is clearly visible without being obstructed. In addition, since the image analysis is performed by a post-processing method, it can be deduced that there is a garbage dumping action by looking at an abandoned object, but there is a disadvantage in that it is impossible to detect it immediately when an event occurs.

Many of the existing methods do not consider the method of detecting abandoned objects, and most of them assume that the object that remains for a long time in the images after the event occurs is dumped. The reason for this is that, despite the recent development of deep learning-based object detectors, it is not easy to define objects that are thrown away, and because they have a wide variety of shapes, they are not detected properly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for automatically detecting an action of dumping garbage in real time from an image in a video surveillance system.

An exemplary embodiment of the present invention provides a method for a detecting apparatus to detect a garbage dumping action from an input image. The method includes: detecting, by the detecting apparatus, a change region, which is a motion region, from the image; generating, by the detecting apparatus, joint information including joint coordinates corresponding to a region in which joints are present from the image; detecting, by the detecting apparatus, an object held by a person from the image using the change region and the joint information; and detecting, by the detecting apparatus, an action of dumping the object based on a distance between the object and the joint coordinates.

The detecting of an action of dumping the object may determine whether or not a garbage dumping action occurs based on a change in each of the distances between all the joint coordinates and the object.

The detecting of an action of dumping the object may determine that a garbage dumping action has occurred when a set number of dumping action detection results among all of the dumping action results for each joint coordinate indicates that the object has been dumped.

The detecting of an action of dumping the object may include: measuring a distance to an object by each joint coordinate; obtaining a distance relationship change based on a distance measured for each joint coordinate; obtaining a dumping action detection result for each joint coordinate based on a comparison result of the obtained distance relationship change and a predetermined value; and if the set number of dumping action detection results among the dumping action detection results of all the joint coordinates indicate that the object has been dumped, finally determining whether the dumping action occurs.

The obtaining of a dumping action detection result for each joint coordinate may include: determining that a dumping action has occurred if the obtained distance relationship change is greater than the predetermined value; and determining that no dumping action has occurred if the obtained distance relationship change is less than or equal to the predetermined value.

The distance relationship change may represent a difference value between the measured distance and a modeled distance with respect to arbitrary joint coordinates, and the modeled distance may represent an average of distances between the arbitrary joint coordinates and the object.

The predetermined value may be a value set in advance based on a set value and a standard deviation which is obtained by modeling the distances between the arbitrary joint coordinates and the object.

The detecting of an action of dumping the object may include: obtaining coordinates of a hand of a person based on the joint information; and determining that a dumping action has occurred if a distance between the coordinates of the hand and the object is greater than a set value.

The method may further include: estimating, by the detecting apparatus, joints from the image based on the joint information; and tracking, by the detecting apparatus, a person from the image based on the joint estimation result. At this time, the detecting of an object and the detecting of an action of dumping the object may be performed for each tracked person.

The tracking of a person from the image may track a person from the image using a head position obtained based on the joint estimation result.

The method may further include finally determining, by the detecting apparatus, whether the dumping action occurs by using at least one of a first method of determining that a garbage dumping action has occurred when a human's pose is a predetermined pose and a second method of determining that a garbage dumping action has occurred based on a state in which a person enters a dumping occurrence possible region.

The finally determining whether the dumping action occurs may include determining that the dumping action has occurred if an estimated pose of a person corresponds to a pose of bending down when a person-holding object is not detected from the image, or when it is not detected that the object is dumped based on the distance between the detected object and the joint coordinates.

The finally determining whether the dumping action occurs may include finally determining that a dumping action has occurred when a person holding the detected object in the detecting of an object enters the dumping occurrence possible region or enters the dumping occurrence possible region and then stays for more than a set time.

When the second method is used, the method may further include detecting a dumping occurrence possible region from the image, wherein the dumping occurrence possible region may be detected from the image by using a map in which a predetermined waste characteristic is learned.

Another embodiment of the present invention provides an apparatus for detecting a garbage dumping action from an input image. The apparatus includes: an input/output unit configured to receive an image input; and a processor connected to the input/output unit and configured to detect a garbage dumping action from the image, wherein the processor is configured to detect a change region, which is a motion region, from the image sent from the input/output unit, to generate joint information including joint coordinates corresponding to a region in which joints are present from the image, to detect an object held by a person from the image using the change region and the joint information, and to detect an action of dumping the object based on a distance between the object and the joint coordinates.

The processor may be further configured to measure each of the distances between all the joint coordinates and the object, to detect a dumping action using the distances measured for each joint, and to determine that a garbage dumping action has occurred when a set number of dumping action detection results among all of the dumping action results for each joint coordinate indicates that the object has been dumped.

The processor may be specifically configured to determine that a dumping action has occurred if a distance relationship change obtained based on a distance measured for each joint coordinate is greater than the predetermined value, and to determine that no dumping action has occurred if the distance relationship change is less than or equal to the predetermined value.

The distance relationship change may represent a difference value between the measured distance and a modeled distance with respect to arbitrary joint coordinates, the modeled distance may represent an average of distances between the arbitrary joint coordinates and the object, and the predetermined value may be a value set in advance based on a set value and a standard deviation which is obtained by modeling the distances between the arbitrary joint coordinates and the object.

The processor may be specifically configured to estimate joints from the image based on the joint information and track a person from the image using a head position obtained based on the joint estimation result, wherein the detecting of an object and the detecting of an action of dumping the object may be performed for each tracked person.

The processor may be specifically configured to finally determine whether a dumping action occurs by additionally using at least one of a first method of determining that a garbage dumping action has occurred when a human's pose is a predetermined pose and a second method of determining that a garbage dumping action has occurred based on a state in which a person enters a dumping occurrence possible region, in addition to detecting a dumping action based on the distance between the detected object and the joint coordinates.

The processor may be specifically configured to determine that the dumping action has occurred if an estimated pose of a person corresponds to a pose of bending down when a person-held object is not detected from the image or when it is not detected that the object is dumped based on the distance between the detected object and the joint coordinates, or to determine that a dumping action has occurred when a person holding the detected object enters the dumping occurrence possible region or enters the dumping occurrence possible region and then stays for more than a set time.

According to the embodiments of the present invention, it is possible to detect objects of various sizes and objects of various sizes and to detect a garbage dumping action.

In addition, it is possible to detect dumping actions in real time for various types of dumping activities.

Further, false detection is reduced by performing detection based on a voting model in dumping action detection.

Therefore, it is possible to detect the dumping action in real time as the false detection is reduced compared with the existing method.

In addition, an alarm for a situation in which a garbage dumping action is suspected to occur can be additionally provided, thereby making it possible to provide a detection method that can be more practically used in an actual system.

DETAILED DESCRIPTION OF THE EMBODIMENTS

Figure 1:
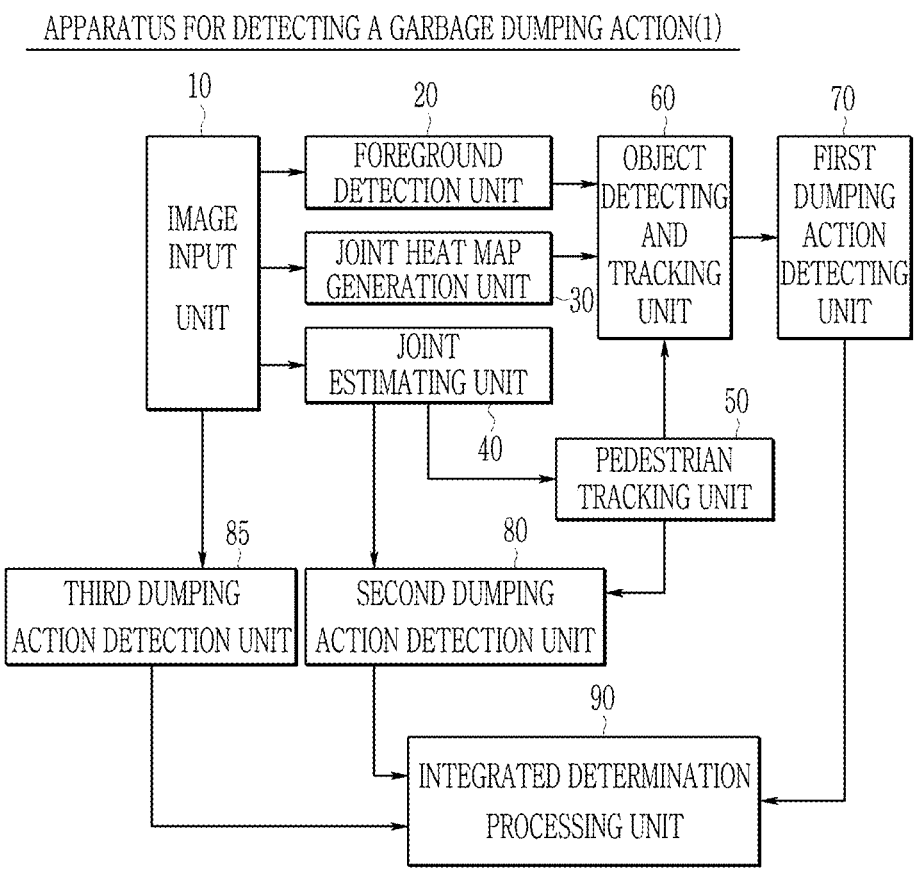
FIG. 1 shows a structure of an apparatus for detecting a garbage dumping action according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements.

The expressions described in the singular may be interpreted as singular or plural unless an explicit expression such as "one", "single", and the like is used.

Furthermore, terms including ordinals such as first, second, etc. used in the embodiments of the present invention can be used to describe elements, but the elements should not be limited by the terms.

The terms are used only for the purpose of distinguishing one component from another. For example, without departing from the scope of the present invention, a first component may be referred to as a second component, and similarly, a second component may be referred to as a first component.

Hereinafter, a method and apparatus for detecting a garbage dumping action in real time in a video surveillance system according to an embodiment of the present invention will be described.

FIG. 1 shows a view illustrating a structure of an apparatus for detecting a garbage dumping action according to an embodiment of the present invention.

As shown in FIG. 1, the apparatus 1 for detecting a garbage dumping action according to an embodiment of the present invention includes an image input unit 10, a foreground detection unit 20, a joint heat map generation unit 30, a joint estimating unit 40, a pedestrian tracking unit 50, an object detecting and tracking unit 60, and a first dumping action detecting unit 70. The apparatus 1 for detecting a garbage dumping action may further include a second dumping action detection unit 80, a third dumping action detection unit 85, and an integrated decision processing unit 90.

The image input unit 10 is configured to receive an image sequence of a plurality of frames corresponding to a video. The video is recorded and then processed to generate images in unit of frames, which are well known in the art, and thus detailed description thereof will be omitted.

The foreground detecting unit 20 is configured to detect a foreground, i.e., a moving region, from an image provided from the image input unit 10. The moving region is referred to as "a change region" for convenience of explanation.

The joint heat map generating unit 30 is configured to generate a joint heat map from the image provided from the image input unit 10. The joint heat map generating unit 30 finds a person from the image, finds the position of each joint of the person searched in the form of a heat map, and generates a joint heat map. The generation of the joint heat map is well known in the art, and a detailed description thereof will be omitted here. The joint heat map represents the probability regions where the joints exist. Hereinafter, for convenience of explanation, the joint heat map is referred to as "joint information", the joint information includes position coordinates corresponding to the probability region where the joints exist, and the position coordinates may be referred to as "joint coordinates".

The joint estimation unit 40 is configured to estimate joints from the image. The joint estimating unit 40 estimates the joints based on the joint heat map. For example, the joint position can be estimated based on the joint coordinates, and joints to which each coordinate of the joint positions is connected can be estimated based on the estimated coordinates of the joint positions.

The pedestrian tracking unit 50 is configured to track a person, that is, a pedestrian, from the image based on the estimated result of the joint estimating unit 40. The pedestrian tracking unit 50 can track a person using the head position based on the estimated joint, which will be described later in detail.

The object detection and tracking unit 60 is configured to detect an object that a person is holding from the image and to track the detected object. The object detection and tracking unit 60 detects an object held by a person from the image by using the change region that is detected by the foreground detection unit 20 and the joint heat map generated by the joint heat map generation unit 30. Generally, the shapes of objects vary, making it difficult to find objects that a person is holding. In the embodiment of the present invention, an object held by a person can be detected using a change region obtained from an image and joint information corresponding to a joint heat map.

In addition, the object detection and tracking unit 60 tracks the detected object. The object detection and tracking unit 60 can use a single object tracking algorithm to temporally track the detected object. The single object tracking algorithm can track fairly robustly if the initial tracking start region is given, but otherwise a drift phenomenon can occur to a large extent. Accordingly, in the embodiment of the present invention, the reliability of the single object tracking algorithm is set, and when the reliability of the detected object is smaller than a predetermined reliability, the object held by a person can be detected again.

On the other hand, the object detection and tracking unit 60 may perform object detection for each person among people detected and tracked by the pedestrian tracking unit 50.

The first dumping action detecting unit 70 detects the garbage dumping action based on the distance between the object detected by the object detecting and tracking unit 60 and the joints of the person, that is, the human joints. The first dumping action detecting unit 70 can detect the garbage dumping action on the basis of the distance between the joint coordinates corresponding to hands among the human joints and the detected and tracked object. That is, if the distance between the hand and the object is large, it is determined that the person has thrown the object. However, in this case, if the joint coordinates of the hand are not properly detected or the tracking of the object is not performed properly, accurate judgment may not be made. In order to compensate for this, the first dumping action detecting unit 70 can detect the garbage dumping action on the basis of distances between all the joints detected from the image and the object to be detected and tracked, not only the joint coordinates corresponding to the hands.

Figure 2:
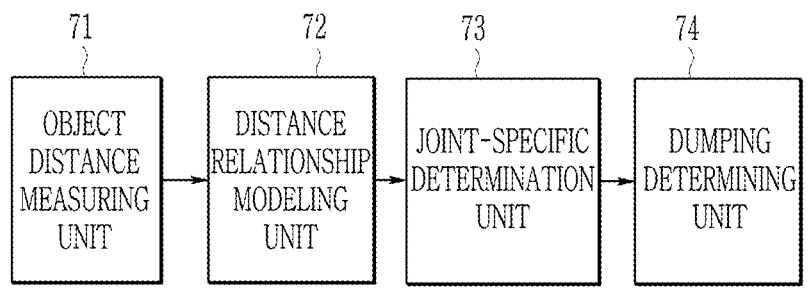
FIG. 2 shows a structure of a first dumping action detecting unit according to an embodiment of the present invention.

FIG. 2 shows a structure of a first dumping action detecting unit according to an embodiment of the present invention.

As shown in FIG. 2, the first dumping action detecting unit 70 according to the embodiment of the present invention includes an object distance measuring unit 71, a distance relationship modeling unit 72, a joint-specific determination unit 73, and a dumping determining unit 74.

The object distance measuring unit 71 is configured to measure a distance between an object to be detected and tracked and a joint of a person. The distance between the joint and the object measured by the object distance measuring unit 71 may include only the distance between the joint coordinates corresponding to the hand of the person and the object, or the distances measured for all detected joints, that is, the distances between each of all joints and the object.

The distance relationship modeling unit 72 is configured to model the distance relationship based on the measured distance between the joint and the object. Based on the distance between the joint and the object, the relationship vector can be learned and the change in the relationship vector can be detected to model the distance relationship. That is, a change of distance relationship is generated.

The joint-specific determination unit 73 is configured to detect the dumping action based on the change of the distance relationship. The joint-specific determining unit 73 compares the distance relationship change with a predetermined value, determines that a dumping action has occurred if the change of the distance relationship is greater than the predetermined value, and determines that no dumping action has occurred if the change of the distance relationship is less than or equal to the predetermined value.

Particularly, when the distance relationship modeling unit 72 obtains the distance relationship changes of the respective distances between all the joints and the object, the joint-specific determination unit 73 compares the change of the distance relationship obtained for each joint with the predetermined value to obtain the detection result of dumping action for each joint. Based on the detection result of dumping action for each joint, it is possible to determine whether or not the dumping action has finally occurred. For example, the joint-specific determination unit 73 determines that a dumping action has finally occurred when a detection result of a predetermined number or more among the detection result of dumping action for each joint indicates that a dumping action has occurred. This will be described later in more detail.

Meanwhile, the apparatus 1 for detecting a garbage dumping action according to an embodiment of the present invention detects whether or not a dumping action has occurred by using regions where garbage dumping is likely to occur and/or a person's pose, in addition to detecting whether or not a dumping action has occurred based on distances between a person's joints and the object to be detected and tracked.

For this additional detection, the second dumping action detection unit 80 is configured to detect whether a dumping action has occurred using a person's pose. The second dumping action detecting unit 80 may estimate a person's pose based on the joints estimated by the joint estimating unit 40 and determine that the garbage dumping action has occurred when the estimated pose corresponds to a predetermined pose. Generally, when a person throws away garbage, he/she will take a specific action such as bending at the waist. The pose of bending at the waist is set as a predetermined pose, and it is determined that the dumping action has occurred when the estimated person's pose is a pose of bending at the waist.

Such dumping action detection based on a pose can compensate a case in which an object such as garbage cannot be seen when detecting whether or not a dumping action has occurred based on a distance between a joint of a person and the object to be detected and tracked.

In addition, for further detection, the third dumping action detecting unit 85 is configured to detect whether or not the dumping action has occurred by using the region where the dumping action is likely to occur, that is, the dumping occurrence possible region. Here, the dumping occurrence possible region may be a region that is previously set that generates a large amount of waste dumping, or may be a region that is detected as a region where garbage dumping is likely to occur from the image.

It is possible to generate a map by learning the characteristics of the garbage that is located in a region where garbage dumping is likely to occur and extract garbage regions from the image based on the generated map. For example, assuming that there are many plastic bags in the garbage, the map is generated by learning the characteristics of the plastic bag, and an algorithm is applied to the image based on the generated map to extract a region where a lot of plastic bags exist from the image.

As described above, the third dumping action detecting unit 85 determines that the dumping action occurs when a person (person tracked by the pedestrian tracking unit 50) is located in the dumping occurrence possible region that is previously set or extracted from the image. Also, the third dumping action detecting unit 85 determines that the dumping action has occurred when a person stays in the dumping occurrence possible region for a predetermined time or longer. When it is determined that the dumping action occurs based on the dumping occurrence possible region, an alarm may be generated to gain attention. In this case, the false detection may be increased due to the occurrence of an alarm every time the camera position changes or a person just passes the dumping occurrence possible region. Therefore, an alarm can be generated by determining that a dumping action will occur when the person holding the object detected by the object detection and tracking unit 60 enters the dumping occurrence possible region.

Meanwhile, the integrated decision processing unit 90 uses the detection results of at least one of the first dumping action detecting unit 70, the second dumping action detecting unit 80, and the third dumping action detecting unit 85 to finally determine whether or not the garbage dumping action has occurred.

Next, a method of detecting a garbage dumping action according to an embodiment of the present invention will be described based on the apparatus having such a structure.

Figure 3:
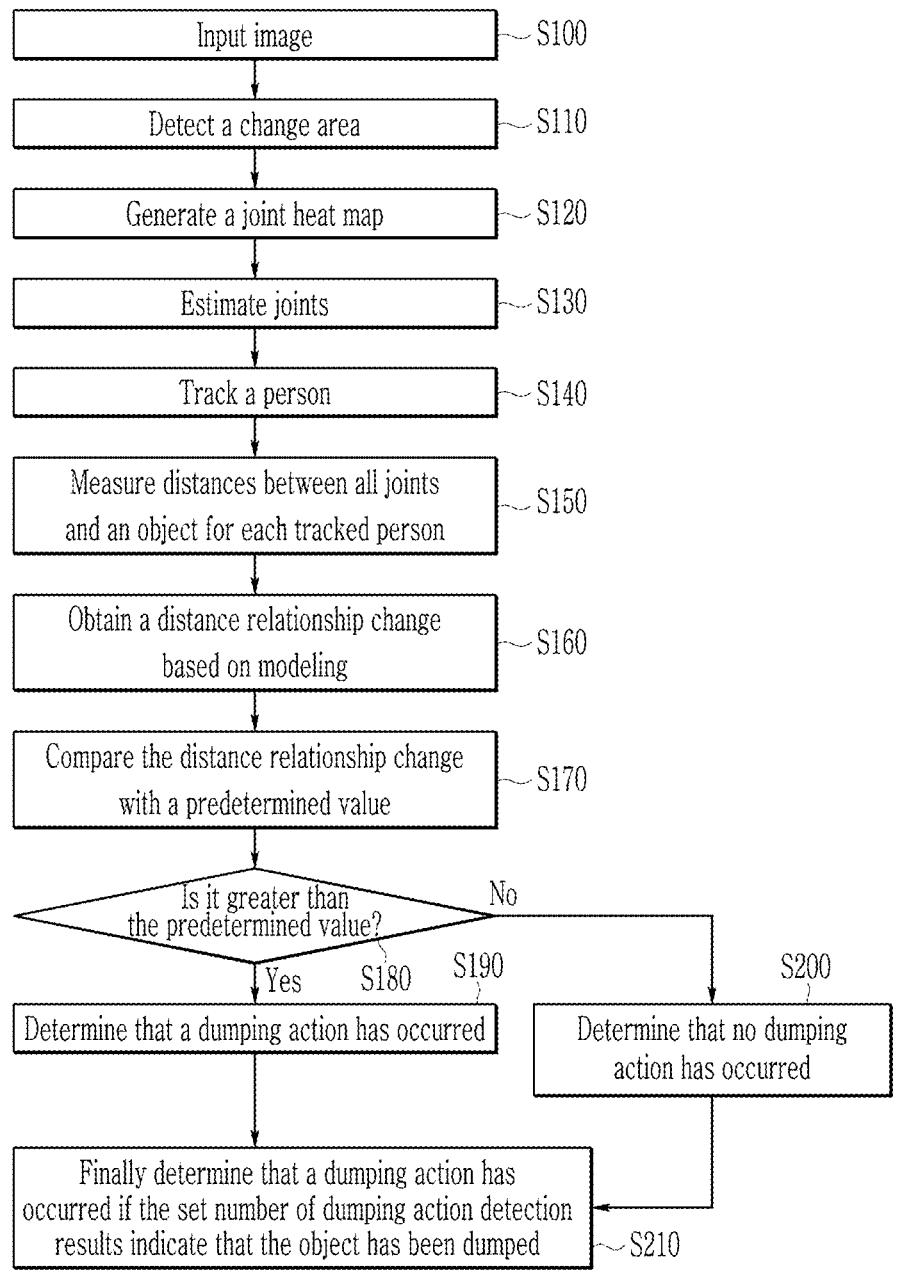
FIG. 3 shows a flowchart of a method of detecting a garbage dumping action according to the first embodiment of the present invention.
Figure 4:
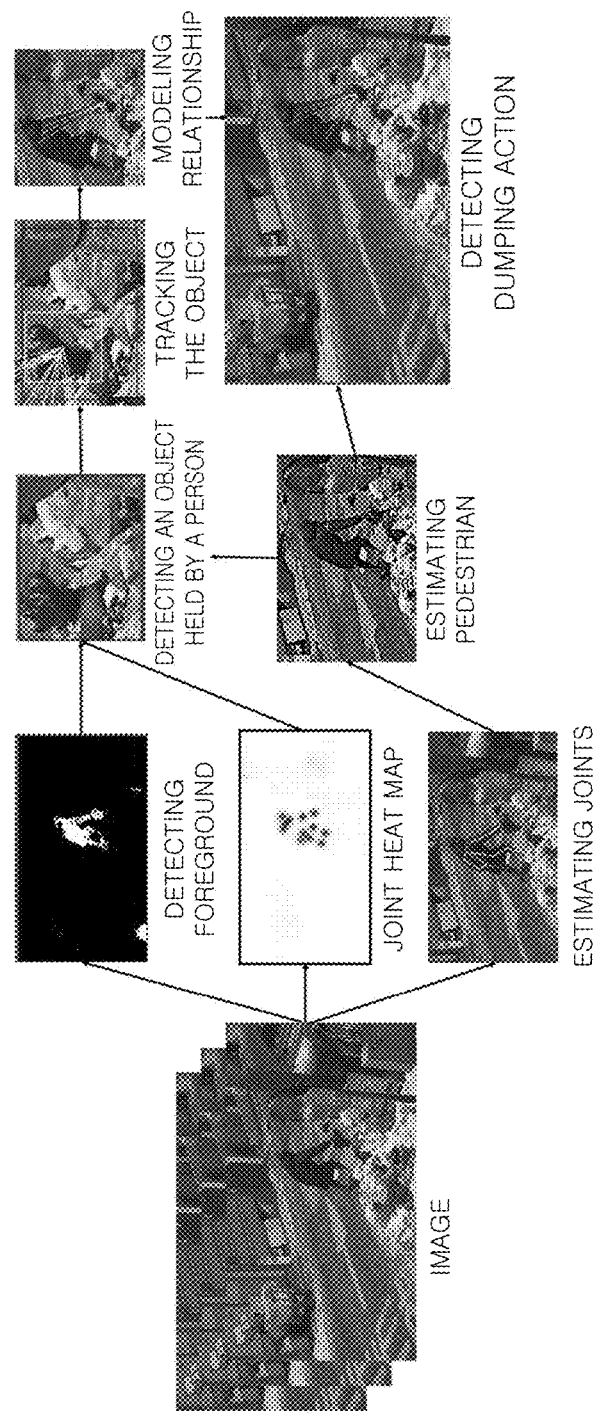
FIG. 4 shows a diagram illustrating an example of detecting a garbage dumping action according to the first embodiment of the present invention.

FIG. 3 shows a flowchart illustrating a method of detecting a garbage dumping action according to a first embodiment of the present invention, and FIG. 4 shows a diagram illustrating an example of a garbage dumping action according to the first embodiment of the present invention.

As shown in FIG. 3, an image sequence of a plurality of frames corresponding to the photographed video is input (S100), and a change region that is a foreground, i.e., a motion region, is detected from the image (S110). For example, the change region is detected from the input image as shown in FIG. 4. At this time, the background of the image is displayed, for example, in black, and the change region is displayed in white, so that people and objects can appear together.

Further, a joint heat map is generated from the image (S120). For example, as shown in FIG. 4, a joint heat map, which is joint information including joint coordinates corresponding to a probability region where joints exist, is generated from the input image. The probability region of joints in the joint heat map can be displayed in black.

Further, joints are estimated from the image (S130). For example, joints are estimated based on the joint heat map generated from the input image as shown in FIG. 4. Specifically, the joint positions can be estimated based on the joint coordinates, and the joint to which each coordinate set of the joint positions is connected can be estimated based on the estimated coordinates of the joint positions.

Next, a person is tracked from the image based on the joint estimation result (S140). In the embodiment of the present invention, a person can be tracked by using a head position based on an estimated joint in person tracking.

In a surveillance environment, a person may be largely blocked by another person. In this case, however, the head is relatively less blocked, making it easier to use as an input for tracking. In the embodiment of the present invention, a person is tracked from an image based on this. At this time, a person may be tracked using a Hungarian matching method. Trajectory information may be used. The trajectory information includes active trajectory information that is being tracked so far and inactive trajectory information that is not currently matched with the current time, and may be used for tracking a person.

Figure 5:
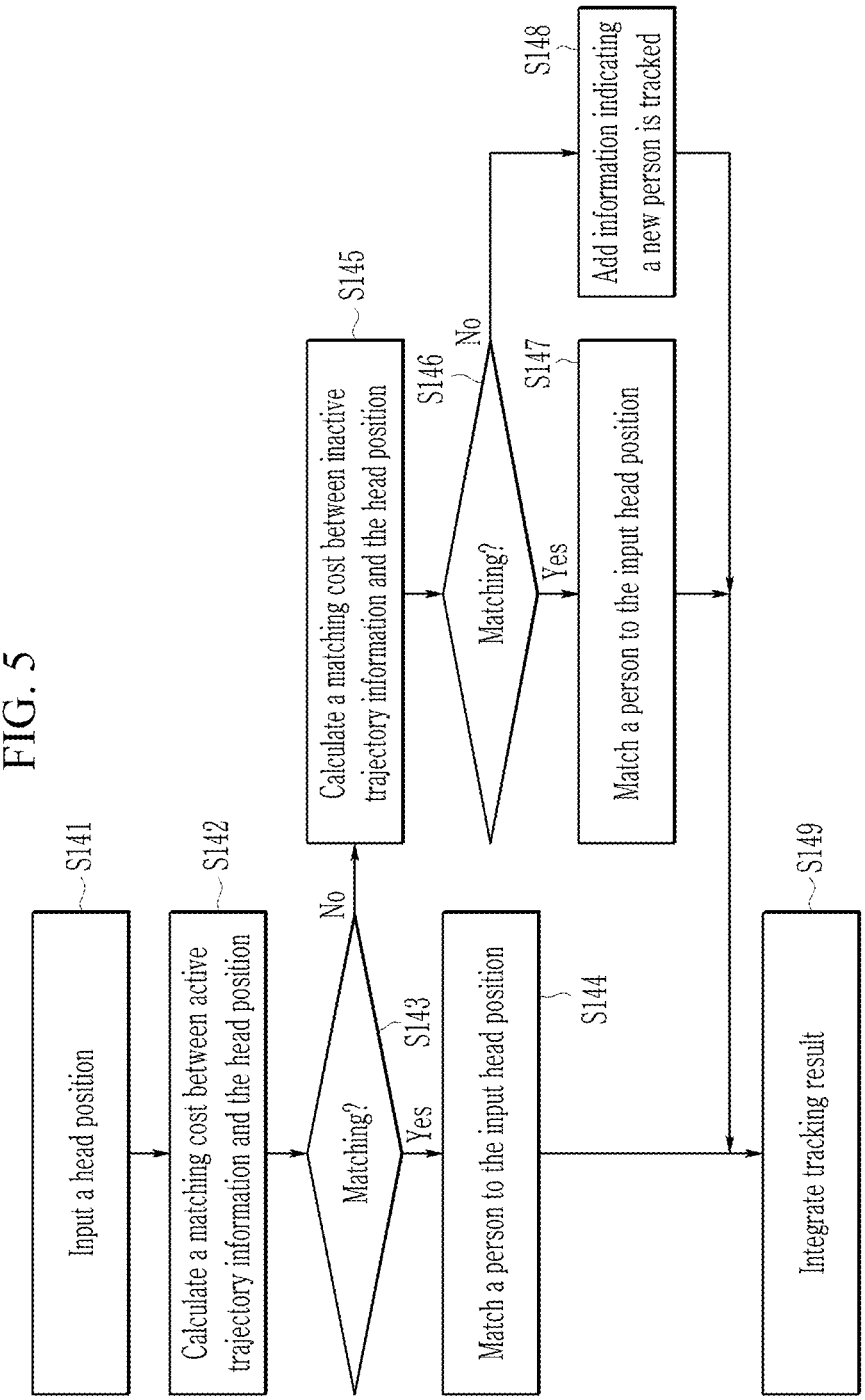
FIG. 5 shows a flowchart illustrating a person tracking process according to an embodiment of the present invention.

FIG. 5 shows a flowchart illustrating a person tracking process according to an embodiment of the present invention.

In the embodiment of the present invention, the head position is used to track a person on the assumption that the head position of an arbitrary person is not significantly changed between frames.

To this end, if an arbitrary head position is input from the current image (S141), a matching cost between the trajectory information, that is, the active trajectory information including the head position corresponding to the person tracked so far and the input head position, is calculated (S142).

If it is determined that the input head position matches the active trajectory information according to the matching cost (S143), the trajectory information is updated. That is, if there is a person with a head position that is matched to the currently input head position, the person is matched to the currently input head position (S144).

If the input head position does not match the active trajectory information, inactive trajectory information including a head position corresponding to a person who is not being tracked at present but has been tracked in the past, and a matching cost between the input head position and the inactive trajectory information is calculated (S145). If it is determined that the input head position matches the inactive trajectory information according to the matching cost (S146), the trajectory information is updated. That is, if there is a person who has a head position that is matched to the currently inputted head position among the people who are not being tracked at present but have been tracked in the past, the person is matched to the currently input head position (S147). If the input head position does not match the inactive trajectory information, it is determined that a new person is being tracked and then the input head position is additionally generated as information on the new person (S148).

In this way, it is possible to track a person from the image according to the matching with the trajectory information based on the head position, and even if the position of the person changes over time, the person can be tracked as the same person according to the tracking based on the head position.

If there are a plurality of tracked persons, one person is selected (S150).

Thereafter, the object carried by the selected person is detected (S160). The object carried by the selected person may be detected and tracked by using the change region and the joint information detected from the image.

Figure 6:
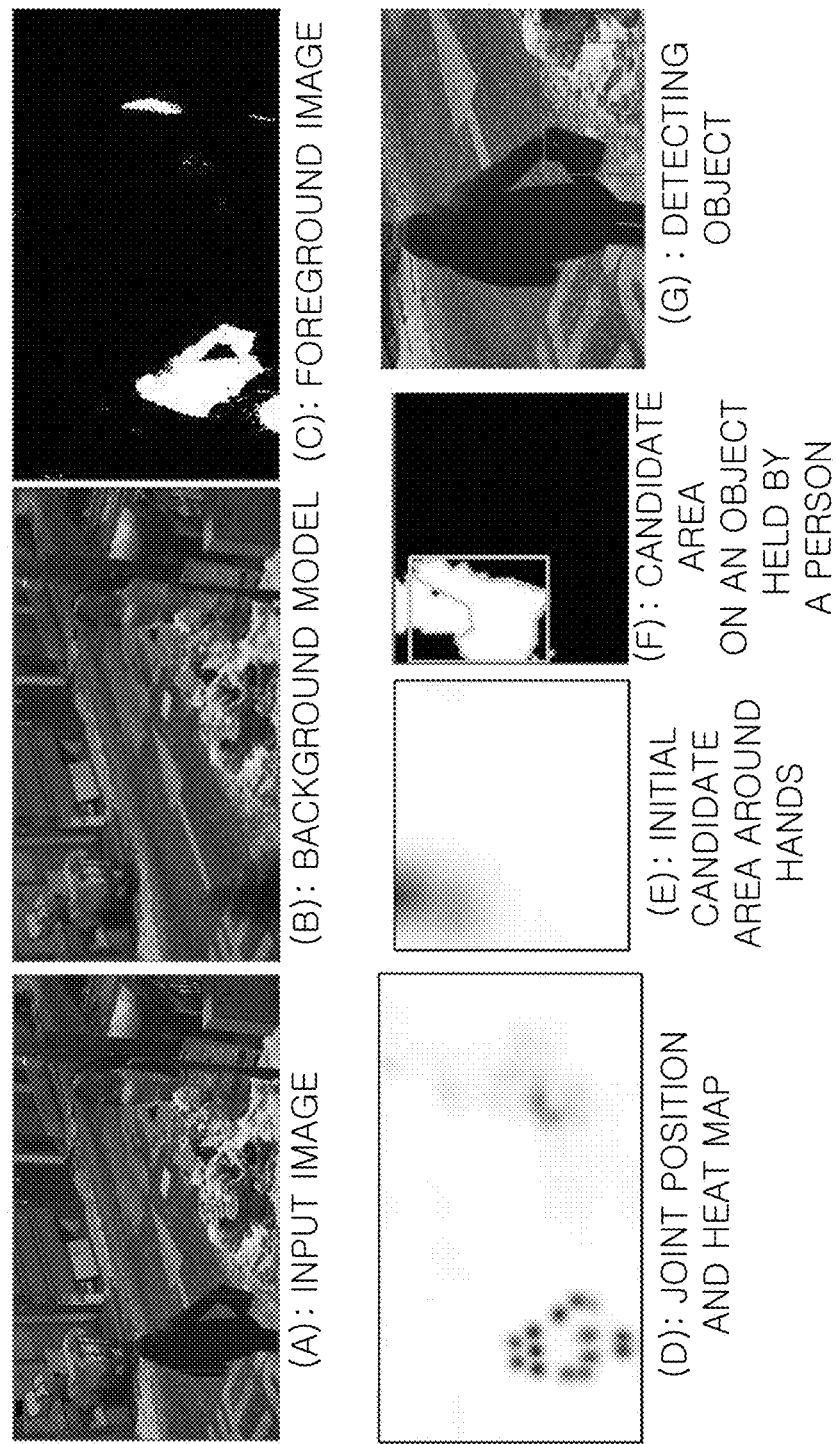
FIG. 6 shows a diagram illustrating an object detecting process according to an embodiment of the present invention.

FIG. 6 shows a diagram illustrating an object detecting process according to an embodiment of the present invention.

For example, in the image shown in (a) of FIG. 6, a change region that is a foreground image as shown in (c) of FIG. 6 is detected according to background modeling as shown in (b) of FIG. 6, and a large lump in which a change region is large among regions around the hand of a person is found by using the joint information shown in (d) of FIG. 6 and the detected change region.

At this time, if the change region around the hand of a person is simply found, the region corresponding to the body of the person may be misjudged as an object to be held, so that it is possible to determine that the object is not the region corresponding to the body of the person by using the information about the body region. For example, if the size of the found large lump is larger than a certain size, and it is not a region belonging to the body of the person, it can be determined as an object held by the person. Here, whether or not the found large lump is a region belonging to the body of the person may be expressed as a heat map as shown in (d) of FIG. 6 by using an algorithm for estimating joints. In (d) of FIG. 6, the blacker the color, the higher the probability of being a part of person's body region. Through this process, the regions around the hands are extracted as shown in (e) and (f) of FIG. 6. The region determined as the hand region in black is separated from the regions around the hands in (f) of FIG. 6, and the remaining region is considered to be the region of the object held by the person. Then, the detected object is temporally tracked using a single object tracking algorithm as shown in (g) of FIG. 6.

Next, a garbage dumping action is detected based on the distance between the object to be detected and tracked and the joint of the person. In this example, instead of using only the distance between the hand and the object, the detection of the garbage dumping action is explained based on the distances between all the joints detected from the image and the object to be detected and tracked.

In the embodiment of the present invention, when the distance between the hand of the person and the object is large, it may be determined that the garbage dumping action has occurred. It may not be possible to make an accurate judgment if the coordinates of the hand are not properly displayed or if the tracking of the object is not performed properly. Therefore, it is determined that the dumping action has occurred based on the change in the distance between all the joints and the object of the person, not the change in the distance between the hand and the object.

First, the distances between the joints of the person and the object to be detected and tracked is measured (S170).

The distance between the coordinates of a joint of a person and the object held by the person is modeled in a form of a 1D Gaussian model, and update each variable according to the modeling with the following equation in every frame.

$$m_i^{(t)} = (1-\eta)m_i^{(t-1)} + \eta d_i^{(t)},$$

$$s_i^{2(t)} = (1-\eta)s_i^{2(t-1)} + \eta v_i^{(t)},$$

$$d_i^{(t)} = \sqrt{(x_{obj}^{(t)} - x_i^{(t)})^2 + (y_{obj}^{(t)} - y_i^{(t)})^2},$$

$$v_i^{(t)} = (d_i^{(t)} - m_i^{(t)})^2. \quad \text{(Equation 1)}$$

Here, $m_i$ represents the average of the distances between the joints and the object, and $s_i^2$ represents the variance of the distances between the joints and the object. $d_i$ represents the distance between the joint and the object. $x_{obj}$ and $y_{obj}$ represent the coordinates of the object, and $x_i$ and $y_i$ represent the coordinates of the joint.

Then, in order to determine whether or not the dumping action of the object has occurred, the distance relationship change according to the modeled distance is obtained for each joint as shown in the following equation (S170), and the distance relationship change is compared with a predetermined value (S180).

$$I_i^{(t)} = \begin{cases} 1 & \text{if } (d_i^{(t)} - m_i^{(t-1)}) > \sqrt{s_i^{2(t-1)}} * th_j, \\ 0 & \text{otherwise} \end{cases} \quad \text{(Equation 2)}$$

Here, the distance relationship change represents a difference value between the currently measured distance $d_i^{(t)}$ and the modeled distance $m_i^{t-1}$. $th_j$ represents a set value, $s_i^{2t-1}$ represents the variance that is the modeled value, and $\sqrt{s_i^{2(t-1)}}$ represents the standard deviation. $\sqrt{s_i^{2(t-1)}} * th_j$ is referred to as "a predetermined value" for convenience of explanation.

In the embodiment of the present invention, it is possible to determine whether or not a garbage dumping action has occurred based on whether or not a distance relationship change, which is a difference between distances, is different by a multiple of a standard deviation.

If the distance relationship change is different by a multiple of the standard deviation, that is, if the distance relationship change is larger than the predetermined value, it is determined that the distance between the joint and the object is large and that the dumping action has occurred, and the value $I_i^{(t)}$ of the detection result of the dumping action is, for example, "1" (S190). If the distance relationship change is not different by a multiple of the standard deviation, that is, if the distance relationship change is less than or equal to the predetermined value, it is determined that there is no change in the distance between the joint and the object and that no dumping action has occurred, and the value $I_i^{(t)}$ of the detection result of the dumping action is, for example, "0" (S200).

The detection result of the dumping action according to the change of the distance relationship between the object and the joint for each joint is obtained. In the embodiment of the present invention, when it is determined that more than the set number of joints among the joints observed are far away from the object, it is determined that the object is finally abandoned (S210). That is, when the detection result of the dumping action on the joints of more than the set number among the all joints is "1", it is finally determined that the dumping action has occurred.

This may be is expressed in the form of an equation as follows.

$$I_{final}^{(t)} = \begin{cases} 1 & \sum_i I_i^{(t)}/N > th_s \\ 0 & \text{otherwise} \end{cases} \quad \text{(Equation 3)}$$

For example, if i=1 to 18, the average m and the variance $s^2$ of the distances to the object are modeled by a total of 18 joints, and a detection result of 0 or 1 is obtained for a total of 18 joints, depending on whether or not the distance relationship change, which is the difference between the currently measured distance and the modeled distance, is different by a multiple of the standard deviation. In the result of this detection, if more than 9 out of a total of 18 are, for example, 1, it is determined to be a dumping action.

As a result of the dumping action using this voting model, it is possible to reduce false detection.

Table 1 shows the result of false detection.

TABLE 1

| Implementation example | Precision | Recall | F-measure |
|---|---|---|---|
| Simple distance method | 0.4805 | 0.4224 | 0.4154 |
| Method using voting | 0.8018 | 0.6244 | 0.6600 |

Here, "Precision" represents (precisely detected events)/(all events detected by the algorithm), and is an indicator for showing poor performance as more false detections occur. "Recall" represents (precisely detected events)/(all correct events), and is an increasing value when events to be detected are missed. "F-measure" is an indicator of false detection.

As shown in the above Table 1, when the dumping action is detected using the voting model, it can be confirmed that the precision is increased and the recall is also increased by simply reducing the false detections compared to the simple distance method of comparing the distance between the hand and the object.

Figure 7:
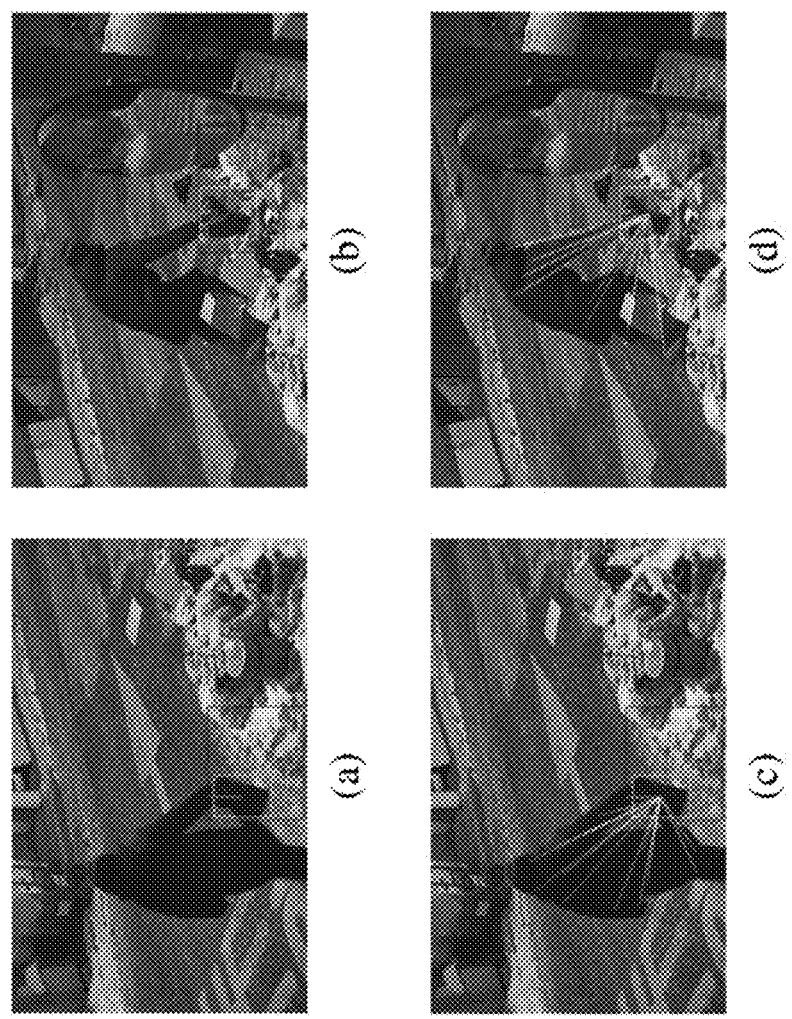
FIG. 7 shows a diagram illustrating an example of garbage dumping action detection result according to an embodiment of the present invention.

FIG. 7 shows a diagram illustrating an example of a garbage dumping action detection result according to an embodiment of the present invention.

As shown in (a) and (b) of FIG. 7, when a dumping action is detected based on the distance between the hand and the object, the dumping action may not be detected until the object is abandoned and completely falls from the hand. When the dumping action is detected based on the respective distances between all the joints and the object as shown in (c) and (d) of FIG. 7, based on the position relationship change between the object and the person, which occurs in the process in which a person leans back and dumps the object or throws it away, it is possible to detect the dumping action more accurately. As described above, the dumping action is finally determined by using the voting method based on the change of relative position with respect to all the joints of a person, so that the dumping action can be judged accurately even in the case of which the detection of arbitrary joints or the tracking of the object is not accurately performed.

The dumping action detection process based on the distances between the joints and the object as described above can be performed for each tracked person.

According to this embodiment, it is possible to easily detect an object to be held by a person regardless of the shape or size of the object, and to accurately detect the dumping action based on the change in distance between the object and the joints of the person.

Figure 8:
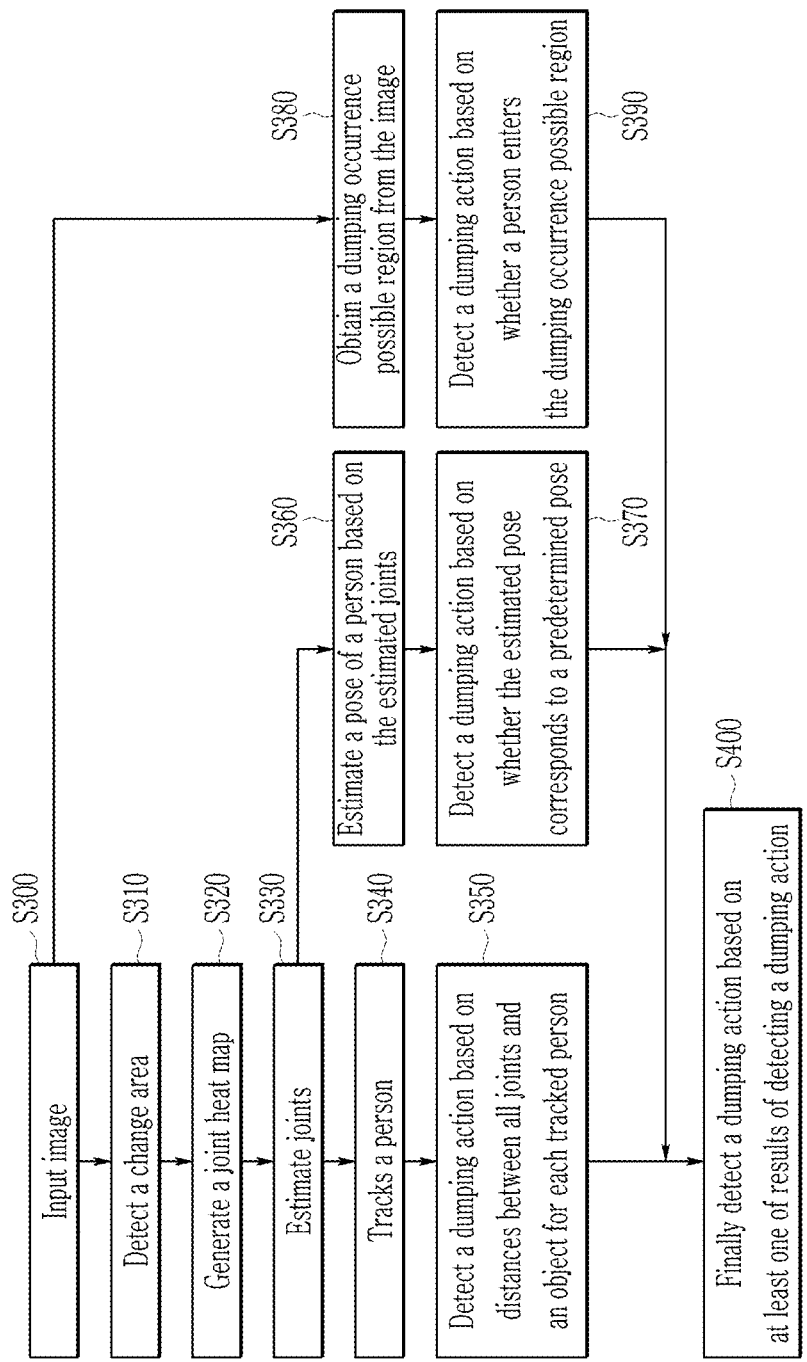
FIG. 8 shows a flowchart of a method of detecting a garbage dumping action according to a second embodiment of the present invention.
Figure 9:
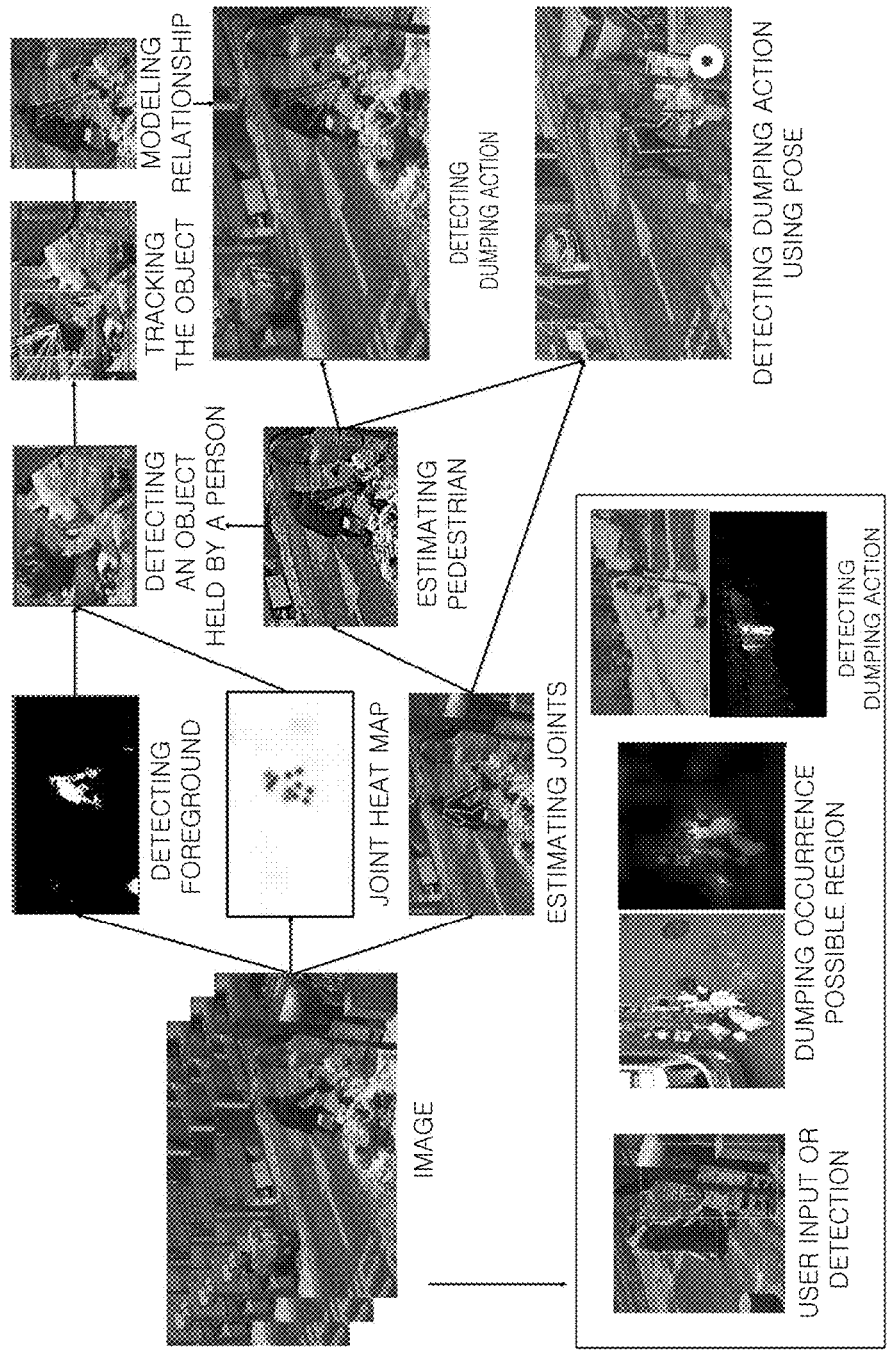
FIG. 9 shows a diagram illustrating an example of detecting a garbage dumping action according to a second embodiment of the present invention.

FIG. 8 shows a flowchart illustrating a method of detecting a garbage dumping action according to a second embodiment of the present invention, and FIG. 9 shows a view illustrating an example of detecting a garbage dumping action according to a second embodiment of the present invention.

In the second embodiment of the present invention, detailed description of the parts that perform in the same way as in the first embodiment will be omitted.

In the second embodiment of the present invention, the method for detecting a dumping action based on a change in pose is performed in addition to the dumping action detection method based on the distance between the joint and the object according to the first exemplary embodiment, and a method of detecting the dumping action based on the dumping occurrence possible region may be additionally performed.

As shown in the FIG. 8, the change region is detected from the image of multiple frames corresponding to the photographed video, the joint heat map is generated, and the joints are estimated. Next, a person is tracked from the image based on the joint estimation result, and the dumping action detection based on the distance between the joint of the person and the object is performed with respect to the tracked person (S300 to S350). This dumping action detection can refer to the parts described in the first embodiment, and therefore, detailed description thereof will be omitted here.

In addition to the dumping action detection process based on the distance between the joint and the object, a pose of the person is estimated based on the joint estimation result obtained in step S330 (S360).

If the estimated person's pose corresponds to a predetermined pose, for example, a pose of bending at the waist as illustrated in FIG. 9, it is determined that the dumping action has occurred (S370). For example, after the tracked person's joint coordinates are accumulated for a set number of frames (e.g., 10 frames), the pose is estimated using a support vector machine (SVM) classifier. In this case, since it is necessary to be able to make a judgment regardless of the position and the size of the person, the respective joint coordinates are converted to relative coordinates using, for example, neck coordinates so that the distance between the neck and the shoulders is converted to 1. Then, the pose may be estimated by the SVM classifier with the converted joint coordinates. As stated above, it is possible to detect the dumping action by using the detection of an action of bending the upper body through the learning of the joint coordinates.

Further, in addition to the garbage dumping action detection process based on the distance between the joint and the object and the garbage dumping action detection based on the person's pose, the garbage dumping action detection based on the dumping occurrence possible region can be performed.

Generally, people often throw away garbage at a place that was previously a garbage place or where much garbage has been abandoned. In other words, a specific place is commonly recognized as a garbage place, and the garbage is continuously abandoned in the specific place. Based on this, a dumping occurrence possible region is set.

The dumping occurrence possible region may be predetermined by a user as a region of origin or may be detected from the image (S380). In the case where the dumping occurrence possible region is detected from the image, as shown in FIG. 9, a region having a large amount of waste plastic bags is extracted from the image as the dumping occurrence possible region by using a map generated based on characteristics of the waste, for example, plastic bags. When extracting the dumping occurrence possible region, it is possible to use a deep learning based image recognition method. For example, using a Class Activation Map (CAM) method to determine where a specific type of object is coming from in an image recognition network that has been learned through about 1000 types, it is possible to find a dumping occurrence possible region where a lot of plastic bags exist.

If a person is detected in the dumping occurrence possible region or if a person stays for a predetermined time in the dumping occurrence possible region, it is determined that there is a possibility of occurrence of a garbage dumping action (S390).

By combining at least one of a result of detection of a dumping action based on a distance between a joint and an object, a result of detection of a dumping action based on a pose of a person, and a result of detection of a dumping action based on a dumping occurrence possible region, it is determined whether or not a dumping action has occurred (S400).

For example, there are many cases where dumped objects are seen before the dumping action, for example, throwing garbage, but dumped objects may not be seen depending on the camera angle or throwing position. If an object is not detected during detection of a dumping action based on the distance between a joint of a person and the object as in this case, it is possible to determine whether or not the dumping action occurs based on the dumping action detection result based on the pose of the person. Of course, in this case as well, it is possible to selectively utilize the detection result of the dumping action based on the dumping occurrence possible region.

In addition, for example, when a dumping action is detected based on the distance between a joint and an object, when a person holding the object enters the dumping occurrence possible region, it can be determined that the dumping action is likely to occur.

According to these embodiments, it is possible to additionally broadcast an alarm for a situation in which a garbage dumping action is suspected to occur even if the garbage dumping action is not performed, thereby preventing the garbage dumping action in advance.

In the dumping action detection method as described above, a method of detecting the dumping action using a time accumulation map can be used. Generally, a person stays for a relatively long time when in the process of throwing garbage except for the case in which a person throws garbage and then immediately leaves. By this feature, information about the place where a person is staying is generated through a cumulative map, and then it is possible to know where a person has spent a relatively long time in the image by using the information. In addition, through the information about where a person is staying, a region where a person has spent a relatively long time may be found as well as the dumping action. For the calculation of the region in which the person stays, the time a person has stayed is accumulated for each pixel after determining the product of the first obtained region of a person and the change region. Then, the longest time for each location based on the accumulated time is stored to generate a time accumulation map. This time accumulation map can be applied to the dumping action detection method described above to reduce false detection.

For example, in the above embodiment, when it is determined that the dumping action has occurred based on the distance between a joint and an object, if it is confirmed that a person has stayed in the place for the set time or longer based on the time accumulation map, it may be determined that no dumping action has occurred.

Figure 10:
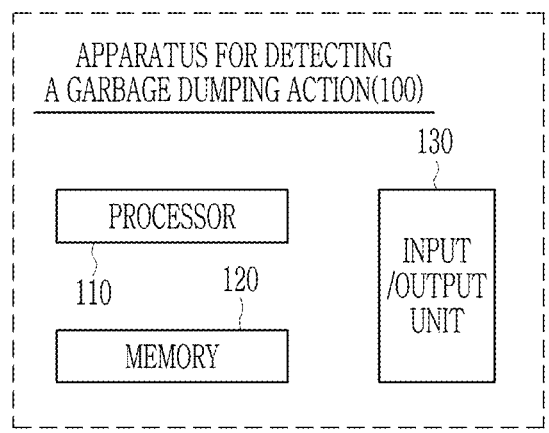
FIG. 10 shows a structure an apparatus for detecting a garbage dumping action according to another embodiment of the present invention.

FIG. 10 shows a structure of an apparatus for detecting a garbage dumping action according to another embodiment of the present invention.

As shown in FIG. 10, an apparatus 100 for detecting a garbage dumping action according to another exemplary embodiment of the present invention includes a processor 110, a memory 120, and an input/output unit 130. The processor 110 may be configured to implement the methods described above based on FIG. 1 to FIG. 9. For example, the processor 110 may be configured to perform the functions of the foreground detection unit, the joint heat map generation unit, the joint estimation unit, the pedestrian tracking unit, the object detection and tracking unit, the first dumping action detection unit, the second dumping action detection unit, the third dumping action detection unit, and the integrated decision processing unit.

The memory 120 is connected to the processor 110 and stores various information related to the operation of the processor 110. The memory 120 stores instructions for an operation to be performed by the processor 110, or may temporarily store an instruction loaded from a storage device (not shown).

The processor 110 may execute instructions that are stored or loaded into the memory 120. The processor 110 and the memory 120 are connected to each other via a bus (not shown), and an input/output interface (not shown) may be connected to the bus.

The input/output unit 130 is configured to output a processing result of the processor 110 or to provide an image to the processor 110. For example, the input/output unit 130 may be configured to generate an alarm according to a processing result of the processor 110.

Exemplary embodiments of the present invention may be implemented through a program for performing a function corresponding to a configuration according to an exemplary embodiment of the present invention and a recording medium with the program recorded therein, as well as through the aforementioned apparatus and/or method, and may be easily implemented by one of ordinary skill in the art to which the present invention pertains from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a detecting apparatus to detect a garbage dumping action from an input image, comprising:
    detecting, by the detecting apparatus, a change region, which is a motion region, from the image;
    generating, by the detecting apparatus, joint information including joint coordinates corresponding to a region in which joints are present from the image;
    estimating, by the detecting apparatus, joints from the image based on the joint information;
    tracking, by the detecting apparatus, a person from the image based on a joint estimation result;
    detecting, by the detecting apparatus, an object held by the tracked person from the image using the change region and the joint information; and
    detecting, by the detecting apparatus, an action of dumping the object based on a distance between the object and the joint coordinates.

2. The method of claim 1, wherein the detecting of an action of dumping the object determines whether or not the garbage dumping action occurs based on a change in each of distances between all the joint coordinates and the object.

3. The method of claim 1, wherein the detecting of an action of dumping the object determines that the garbage dumping action has occurred when a set number of dumping action detection results among all of the dumping action detection results for each joint coordinate indicates that the object has been dumped.

4. The method of claim 3, wherein the detecting of an action of dumping the object comprises:
    measuring a distance to an object based on each joint coordinate;
    obtaining a distance relationship change based on the distance measured for each joint coordinate;
    obtaining a dumping action detection result for each joint coordinate based on a comparison result of the obtained distance relationship change and a predetermined value; and
    if the set number of dumping action detection results among the dumping action detection results of all the joint coordinates indicate that the object has been dumped, finally determining whether the dumping action occurs.

5. The method of claim 4, wherein the obtaining of a dumping action detection result for each joint coordinate comprises:
    determining that the dumping action has occurred if the obtained distance relationship change is greater than the predetermined value; and
    determining that no dumping action has occurred if the obtained distance relationship change is less than or equal to the predetermined value.

6. The method of claim 4, wherein the distance relationship change represents a difference value between the measured distance and a modeled distance with respect to arbitrary joint coordinates, the modeled distance represents an average of distances between the arbitrary joint coordinates and the object, and the predetermined value is a value set in advance based on a set value and a standard deviation which is obtained by modeling distances between the arbitrary joint coordinates and the object.

7. The method of claim 1, wherein the detecting of an action of dumping the object comprises:

obtaining coordinates of a hand of a person based on the joint information; and determining that the dumping action has occurred if a distance between the coordinates of the hand and the object is greater than a set value.

8. The method of claim 1, wherein the detecting of an object and the detecting of an action of dumping the object are performed for each of tracked persons.

9. The method of claim 1, wherein the tracking of a person from the image tracks the person from the image using a head position obtained based on the joint estimation result.

10. The method of claim 1, further comprising finally determining, by the detecting apparatus, whether the dumping action occurs by using at least one of a first method of determining that the garbage dumping action has occurred when a human's pose is a predetermined pose and a second method of determining that the garbage dumping action has occurred based on a state in which the person enters a dumping occurrence possible region.

11. The method of claim 10, wherein the finally determining whether the dumping action occurs comprises determining that the dumping action has occurred if an estimated pose of the person corresponds to a pose of bending down when an object held by the person is not detected from the image, or when it is not detected that the object is dumped based on the distance between the detected object and the joint coordinates.

12. The method of claim 10, wherein the finally determining whether the dumping action occurs comprises finally determining that the dumping action has occurred when the person holding the detected object in the detecting of the object enters the dumping occurrence possible region or enters the dumping occurrence possible region and then stays for more than a set time.

13. The method of claim 10, wherein when the second method is used, the method further comprises detecting the dumping occurrence possible region from the image, wherein the dumping occurrence possible region is detected from the image by using a map in which a predetermined waste characteristic is learned.

14. The method of claim 1, wherein the detecting of an object comprises finding, by using the change region and the joint information, a part in which the change region is greater than a predetermined condition around a hand of the tracked person; and detecting the found part as the object when an area of the found part is greater than a predetermined value and the found part does not belong to the tracked person.

15. An apparatus for detecting a garbage dumping action from an input image, comprising:

an input/output unit configured to receive an image input; and a processor connected to the input/output unit and configured to detect the garbage dumping action from the image, wherein the processor is configured to detect a change region, which is a motion region, from the image received by the input/output unit, generate joint information including joint coordinates corresponding to a region in which joints are present from the image, estimate joints from the image based on the joint information and track a person from the image based on a joint estimation result, detect an object held by the tracked person from the image using the change region and the joint information, and detect an action of dumping the object based on a distance between the object and the joint coordinates.

16. The apparatus of claim 15, wherein the processor is further configured to measure each of distances between all the joint coordinates and the object, to detect the dumping action using the distances measured for each of the joint coordinates, and to determine that the garbage dumping action has occurred when a set number of dumping action detection results among all of the dumping action detection results for each joint coordinate indicates that the object has been dumped.

17. The apparatus of claim 15, wherein the processor is specifically configured to determine that the dumping action has occurred if a distance relationship change obtained based on a distance measured for each joint coordinate is greater than a predetermined value, and to determine that no dumping action has occurred if the distance relationship change is less than or equal to the predetermined value, wherein the distance relationship change represents a difference value between the measured distance and a modeled distance with respect to arbitrary joint coordinates, the modeled distance represents an average of distances between the arbitrary joint coordinates and the object, and the predetermined value is a value set in advance based on a set value and a standard deviation which is obtained by modeling distances between the arbitrary joint coordinates and the object.

18. The apparatus of claim 15, wherein the processor is specifically configured to track the person from the image using a head position obtained based on the joint estimation result, wherein the detecting of the object and the detecting of the action of dumping the object are performed for each of tracked persons.

19. The apparatus of claim 15, wherein the processor is specifically configured to finally determine whether the dumping action occurs by additionally using at least one of a first method of determining that the garbage dumping action has occurred when a human's pose is a predetermined pose and a second method of determining that the garbage dumping action has occurred based on a state in which the person enters a dumping occurrence possible region, in addition to detecting the dumping action based on the distance between the detected object and the joint coordinates.

20. The apparatus of claim 19, wherein the processor is specifically configured to determine that the dumping action has occurred if an estimated pose of the person corresponds to a pose of bending down when an object held by the person is not detected from the image or when it is not detected that the object is dumped based on the distance between the detected object and the joint coordinates, or to determine that the dumping action has occurred when the person holding the detected object enters the dumping occurrence possible region or enters the dumping occurrence possible region and then stays for more than a set time.

* * * * *